(12) United States Patent
Chu et al.

(10) Patent No.: US 10,315,155 B2
(45) Date of Patent: Jun. 11, 2019

(54) HIGHLY POROUS FIBROUS NETWORK MATERIALS FOR GAS FILTRATION

(71) Applicant: The Research Foundation for the State University of New York, Albany, NY (US)

(72) Inventors: Benjamin Chu, Setauket, NY (US); Benjamin S. Hsiao, Setauket, NY (US); Hongyang Ma, East Setauket, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 160 days.

(21) Appl. No.: 15/315,431

(22) PCT Filed: May 27, 2015

(86) PCT No.: PCT/US2015/032531
§ 371 (c)(1),
(2) Date: Dec. 1, 2016

(87) PCT Pub. No.: WO2015/187412
PCT Pub. Date: Dec. 10, 2015

(65) Prior Publication Data
US 2017/0106334 A1   Apr. 20, 2017

Related U.S. Application Data

(60) Provisional application No. 62/007,446, filed on Jun. 4, 2014.

(51) Int. Cl.
*B01D 53/22* (2006.01)
*B82Y 30/00* (2011.01)
(Continued)

(52) U.S. Cl.
CPC ....... *B01D 53/228* (2013.01); *B01D 39/1692* (2013.01); *B01D 39/18* (2013.01);
(Continued)

(58) Field of Classification Search
CPC ........ B01D 71/26; B01D 69/12; B01D 71/10; B01D 69/105; B01D 53/228; B01D 67/0006; B01D 2323/30
See application file for complete search history.

(56) References Cited

U.S. PATENT DOCUMENTS 8,211,958 B2   7/2012   Chu et al.
8,563,657 B2 *  10/2013   Hsiao .................. C07D 233/56
                                                525/244
(Continued)

FOREIGN PATENT DOCUMENTS

CN         101947417 A      1/2011

OTHER PUBLICATIONS

Int'l Preliminary Report and Written Opinion of the Int'l Searching Authority issued in Appl. No. PCT/US15/32531 dated Dec. 15, 2016.

*Primary Examiner* — Anthony R Shumate
(74) *Attorney, Agent, or Firm* — Carter, DeLuca & Farrell LLP

(57) ABSTRACT

Membranes are provided for filtering a gas, in some cases air. Membranes using a highly porous cellulose nano fibrous barrier layer with a highly porous (surface-charged) substrate can exhibit high flux, high retention, and low pressure drop in air filtration of toxic aromatic gases, fumes, bacteria, viruses, dusts, and particulate matters.

22 Claims, 10 Drawing Sheets

(51) Int. Cl.
*B01D 67/00* (2006.01)
*B01D 69/10* (2006.01)
*B01D 69/12* (2006.01)
*B01D 71/10* (2006.01)
*B01D 39/16* (2006.01)
*B01D 39/18* (2006.01)
*B01D 71/26* (2006.01)

(52) U.S. Cl.
CPC ....... *B01D 67/0006* (2013.01); *B01D 69/105* (2013.01); *B01D 69/12* (2013.01); *B01D 71/10* (2013.01); *B01D 71/26* (2013.01); *B82Y 30/00* (2013.01); *B01D 2239/025* (2013.01); *B01D 2323/30* (2013.01)

(56) References Cited

U.S. PATENT DOCUMENTS

| | | | | |
|---|---|---|---|---|
| 9,692,049 | B2* | 6/2017 | Hwang | H01M 4/366 |
| 9,862,665 | B2* | 1/2018 | Chu | C07C 29/76 |
| 9,869,688 | B2* | 1/2018 | Bremer | G01N 35/1079 |
| 9,919,274 | B2* | 3/2018 | Mitra | B01D 69/12 |
| 2006/0155376 | A1* | 7/2006 | Asgari | B82Y 30/00 |
| | | | | 623/16.11 |
| 2006/0193982 | A1* | 8/2006 | Zafera | B05D 3/08 |
| | | | | 427/248.1 |
| 2008/0290020 | A1* | 11/2008 | Marand | B01D 53/228 |
| | | | | 210/500.27 |
| 2009/0324996 | A1* | 12/2009 | Swift | H01M 4/90 |
| | | | | 429/2 |
| 2010/0025330 | A1* | 2/2010 | Ratto | B01D 67/0079 |
| | | | | 210/651 |
| 2010/0072062 | A1 | 3/2010 | Curry | |
| 2010/0295511 | A1* | 11/2010 | Kikuchi | B01D 67/0027 |
| | | | | 320/128 |
| 2010/0320140 | A1* | 12/2010 | Nowak | B01D 61/025 |
| | | | | 210/490 |
| 2011/0026189 | A1* | 2/2011 | Wei | H01G 9/058 |
| | | | | 361/502 |
| 2011/0137109 | A1* | 6/2011 | Zahnert | H04R 25/606 |
| | | | | 600/25 |
| 2012/0297976 | A1* | 11/2012 | Sano | B01D 53/22 |
| | | | | 95/47 |
| 2013/0306915 | A1* | 11/2013 | Lee | C03C 17/22 |
| | | | | 252/502 |
| 2015/0076056 | A1* | 3/2015 | Iyuke | B01D 67/0009 |
| | | | | 210/500.41 |
| 2015/0096935 | A1* | 4/2015 | Mitra | B01D 67/0088 |
| | | | | 210/500.23 |
| 2015/0217236 | A1* | 8/2015 | Nishimura | B01D 53/228 |
| | | | | 96/9 |
| 2015/0276780 | A1* | 10/2015 | Bremer | B01D 53/02 |
| | | | | 73/23.41 |
| 2017/0113189 | A1* | 4/2017 | Atieh | B01D 67/0083 |
| 2018/0015424 | A1* | 1/2018 | Exley | B01D 67/0093 |
| 2018/0065105 | A1* | 3/2018 | Song | B01J 20/28035 |

* cited by examiner ns to the benefit of, International Patent Application No.
HIGHLY POROUS FIBROUS NETWORK MATERIALS FOR GAS FILTRATION

CROSS REFERENCE TO RELATED APPLICATIONS

This application is a National Stage of, and claims priority to and the benefit of, International Patent Application No. PCT/US2015/032531 filed on May 27, 2015, which, in turn, claims the benefit of, and priority to, U.S. Provisional Patent Application Ser. No. 62/007,446, filed on Jun. 4, 2014, the entire disclosures of each of which are incorporated by reference herein.

BACKGROUND

Filtration is used to separate one substance from another by entrapment within or on a filter medium. Air filtration, i.e., the removal of unwanted particles from air, can be important in both industrial and personal applications, especially as pollution in certain areas becomes worse. A variety of pulmonary diseases, induced by serious air pollution, can cause numerous health problems, including death, in numerous people, especially the elderly and children. Therefore, in recent years an increasing number of people have begun to wear face masks (e.g., in parts of China and Japan) due to air pollution or dust storms.

Air filters may be formed of various materials, including electro-spun nanofibers. Due to costs and the potentially extreme physical and chemical environments that some filters endure, any improvement in the durability, filtration efficiency, chemical resistance, weight and/or resilience from compression may be useful.

SUMMARY

The present disclosure provides membranes for filtering a gas, in some cases air, as well as methods for producing such membranes. The membranes can exhibit high flux, high retention, and low pressure drop in air filtration of toxic aromatic gases, fumes, bacteria, viruses, dusts, and particulate matters.

In embodiments, membranes of the present disclosure include at least a first substrate layer, and at least a second layer including a three-dimensional network. In embodiments, the substrate may include a polyolefin modified with at least one ionic compound. The three-dimensional network, in embodiments, may include a material selected from the group consisting of polysaccharide nanofibers, cellulose nanofibers, chitin nanofibers, chitosan nanofibers, polysaccharide nanofibrils, polysaccharide nanostrips, cellulose nanostrips, carbon nanofibers, carbon nanotubes, porous graphene nanosheets, porous graphene oxide nanosheets, bacterial cellulose, and combinations thereof. In some embodiments, the three-dimensional network may be cross-linked with a crosslinking agent.

Methods for producing membranes of the present disclosure include, in embodiments, contacting a porous substrate including polyolefin with at least one ionic compound to form a substrate; and applying to the substrate a three-dimensional network, to form the filtration membrane. The three-dimensional network may include, a material such as polysaccharide nanofibers, cellulose nanofibers, chitin nanofibers, chitosan nanofibers, polysaccharide nanofibrils, polysaccharide nanostrips, cellulose nanostrips, carbon nanofibers, carbon nanotubes, porous graphene nanosheets, porous graphene oxide nanosheets, bacterial cellulose, and combinations thereof. In some embodiments, the three-dimensional network may be contacted with a crosslinking agent to crosslink the three-dimensional network.

Processes for filtering gases, in embodiments air, with membranes of the present disclosure are also provided.

BRIEF DESCRIPTION OF THE DRAWINGS

Various embodiments of the present disclosure will be described herein with reference to the following figures, wherein.

DETAILED DESCRIPTION

Figure 1:
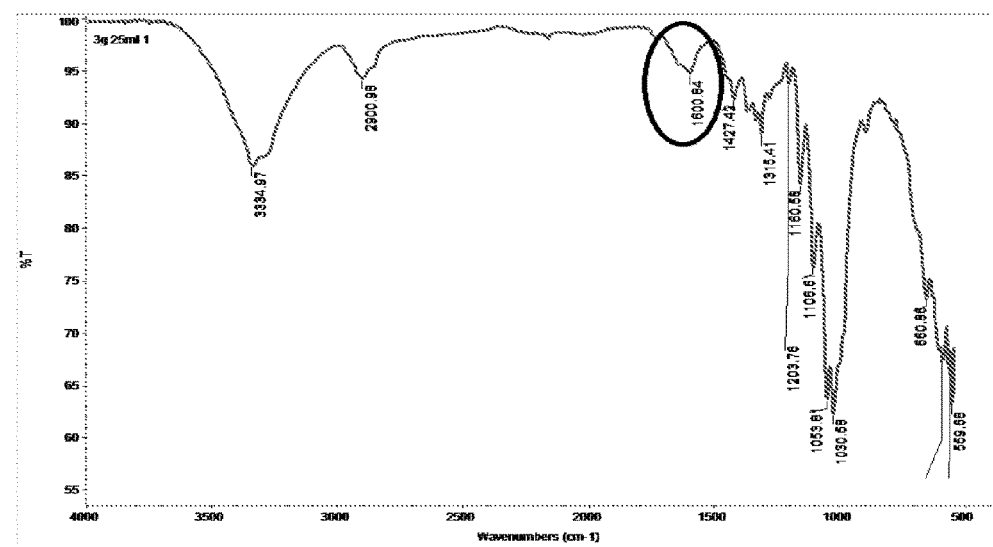
FIG. 1 is an ATR spectrum of a porous paper-like substrate made from oxidized cellulose slurries obtained from wood pulp, suitable for use in a filter membrane of the present disclosure.

The present disclosure provides novel nanofibrous gas (or air) filtration membranes, which have a highly porous (surface-charged) substrate and a highly porous cellulose nanofibrous barrier layer.

In embodiments, the highly porous nanofibrous/fibrous materials of the present disclosure possesses hierarchically layered structures which exhibit high filtration efficiency, i.e., high flux, high retention, and low pressure drop. Membranes of the present disclosure are suitable for gas (including air) filtration where airborne bacteria/viruses, harmful particles/dusts (such as particulate matter), toxic gases, and liquid droplets are to be selectively removed from contaminated gas (including air).

Filters of the present disclosure may include layered structures, with various layers making up the structure. For example, in embodiments, one layer of a filtration membrane of the present disclosure may include a highly porous substrate, such as a mechanically strong microfibrous (melt-blown) substrate material. Any fibrous substrate currently in use with membranes for air filtration may be used including, but not limited to, hydrophilic polymers, hydrophobic polymers, hydrophilic/hydrophobic copolymers, polyelectrolytes and ion-containing polymers.

Specific examples of polymers which may be utilized as a fibrous substrate include, but are not limited to, polyolefins including polyethylene and polypropylene, polyesters including polyethylene terephthalate, polytrimethylene terephthalate and polybutylene terephthalate, polyamides including nylon 6, nylon 66, and nylon 12, polyurethanes, fluorinated polymers, polyetherketones, polystyrene, sulfonated polyetherketones, sulfonated polystyrene and derivatives thereof, cellulose and derivatives thereof, and copolymers thereof.

In some embodiments, suitable porous substrates, in fibrous or foam format, may include hydrophobic/hydrophilic copolymers. Such copolymers include, but are not limited to, polyurethane copolymers, polyurea copolymers, polyether-b-polyamide, PEG modified fluorinated copolymers, ethylene-propylene copolymers, cellulose based copolymers, ethylene based copolymers, and propylene based copolymers. These copolymers, which possess excellent mechanical strength and durability, may be useful in embodiments where such characteristics are desired for the membrane.

A porous substrate can be fabricated from oxidized cellulose pulps, which exhibit not only excellent mechanical property but also functional surface (e.g., negatively charged surface) generated from the oxidation process for enhancing filtration efficiency. More than that, the pore size of the porous paper substrate can also be adjusted to stop the leaking of cellulose nanofibers from a 3D network, if any. Attention is directed to (i) the porosity and (ii) its resistance to moisture. Thus, where cellulose is used, the porous substrate should be fabricated using processes different from normal paper production, implying a reduction in calendaring in order to preserve the 3D network structure and the use of techniques permitting a loose network formation. With respect to the moisture resistance, polysaccharide-based rod-like fibers can be lightly coated with polymers, especially functionalized polymers exhibiting hydrophobic or hydrophilic properties, with the choice depending on specific applications.

In some embodiments, suitable substrates may be formed of polyethylenes, polypropylenes, ethylene-propylene copolymers, ultra-high molecular weight polyethylenes, high pressure low density polyethylenes, linear low density polyethylenes, linear medium density polyethylenes, high density polyethylenes, and modified polyethylenes.

In embodiments, the substrate may be modified so that it has a surface charge. Suitable methods for modifying a substrate include, for example, exposure to an ionic liquid. Suitable ionic liquids and methods for using them to modify other materials, including the substrates noted herein, are disclose in U.S. Pat. Nos. 8,211,958 and 8,563,657, the entire disclosures of each of which are incorporated by reference herein.

Any suitable ionic liquid may be utilized to modify a substrate. For example, 1-docosanyl-3-methylimidazolium bromide ionic liquid (sometimes referred to herein as ionic liquid I) and 1-docosanyl-3-methylimidazolium hexafluorophosphate ionic liquid (sometimes referred to herein as ionic liquid II), 1-hydroxyethyl-3-docosanylimidazolium bromide (sometimes referred to herein as ionic liquid III) and 1-aminoethyl-3-docosanylimidazolium bromide (sometimes referred to herein as ionic liquid IV), the synthesis of each of which is set forth in greater detail below in the Examples. Suitable ionic liquids include those listed below in Table 1, in which Br: bromide; $BF_4$: tetrafluoroborate; $PF_6$: hexafluorophosphate; $Tf_2N$: bis(perfluoroethylsulfonyl)imide.

TABLE 1

| Ionic liquids | Cation | Anion (A) | Length of substituted group (n) |
|---|---|---|---|
| 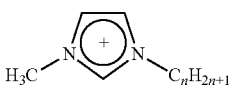<br>[A]⁻ | imidazolium | Br<br>$BF_4$<br>$PF_6$<br>$Tf_2N$ | 14; 16; 18; 20; 22 |
| <br>[A]⁻ | imidazolium | Br<br>$BF_4$<br>$PF_6$<br>$Tf_2N$ | 14; 16; 18; 20; 22 |

TABLE 1-continued

| Ionic liquids | Cation | Anion (A) | Length of substituted group (n) |
|---|---|---|---|
| (pyridinium structure with $C_nH_{2n+1}$) [A]⁻ | pyridinium | Br BF$_4$ PF$_6$ Tf$_2$N | 14; 16; 18; 20; 22 |
| (isoquinolinium structure with $C_nH_{2n+1}$) [A]⁻ | isoquinolinium | Br BF$_4$ PF$_6$ Tf$_2$N | 14; 16; 18; 20; 22 |
| (benzoimidazolium structure with CH$_3$ and $C_nH_{2n+1}$) [A]⁻ | benzoimidazolium | Br BF$_4$ PF$_6$ Tf$_2$N | 14; 16; 18; 20; 22 |
| (benzoimidazolium structure with two $C_nH_{2n+1}$) [A]⁻ | benzoimidazolium | Br BF$_4$ PF$_6$ Tf$_2$N | 14; 16; 18; 20; 22 |

The functions of ionic liquids can be as viscosity adjustable agents (plasticizers), and as a compatiblizer to multi-component blends, including color dyes, molecular fingerprint agents (e.g. fluorescent agents), and antimicrobial agents. The non-ionic part (e.g. long alkyl substituted group) of the ionic liquid can be made compatible with a polyolefin (e.g. polyethylene, polypropylene, their random and block copolymers).

In embodiments, suitable ionic liquids include, for example, 1-docasanyl-3-methylimidazolium bromide, 1-docosanyl-3-methylimidazolium hexafluorophosphate, 1-hydroxyethyl-3-docosanylimidazolium bromide, 1-aminoethyl-3-docosanylimidazolium bromide, 1-docosanyl-3-methylimidazolium tetrafluoroborate, 1-docosanyl-3-methylimidazolium hexafluorophosphate, 1-docosanyl-3-methylimidazolium bis(trifluoromethanesufonyl)amine, 1,3-di-docosanylimidazolium bromide, 1,3-di-docosanylimidazolium hexafluorophosphate, 1,3-di-docosanylimidazolium bis(trifluoromethanesufonyl)amine, 1-docosanylpyridium bromide, 1-docosanylpyridium hexafluorophosphate, 1-docosanylisoquinolinium bromide, 1-docosanylisoquinolinium hexafluorophosphate, 1-docosanylisoquinolinium bis(trifluoromethanesufonyl)amine, 1-docosanyl-3-methyl benzoimidazolium bromide, 1-docosanyl-3-methylbenzoimidazolium hexafluorophosphate, 1-docosanyl-3-methylbenzoimidazolium bis(trifluoromethanesufonyl)amine, 1,3-di-docosanylbenzoimidazolium hexafluorophosphate, 1,3-di-docosanylbenzoimidazolium bis(trifluoromethanesufonyl)amine, combinations thereof, and the like.

The ionic liquid may be contacted with the substrate utilizing any method within the purview of one skilled in the art, including dipping, spraying, brushing, etc.

In embodiments, ionic liquids with long alkyl substituted group can be incorporated into PE or PP to fabricate PE/PP fibrous substrates by melt-blowing, where an electrically charged surface can be created to enhance the filtration (adsorption) efficiency of the substrate and thus also any membrane formed of the substrate. Ionic liquids with long alkyl substituted groups can be incorporated into PE or PP where the surface functionalized PE/PP substrates can be produced with high surface charge density that will enhance the adsorption capability of the substrate layer of any membrane formed of the substrate for any charged species in gas (or air), such as toxic aromatic gases, bacteria, viruses, dusts, and particulate matters.

Modifying these substrates may enhance their affinity for other fibers in the substrate, as well as other materials used to form any additional layers of the filtration media of the present disclosure. Ionic modifications of the materials used to form the substrate may also significantly improve the mechanical toughness of the substrate.

A second layer used to form a filtration membrane of the present disclosure may include, in embodiments, a highly porous barrier layer of a 3-dimensional (3D) functionalized nanofibrous network structure that can be fabricated with plant or animal based fibers. Examples of nanofibers that can be used to form 3D networks are listed below in Table 2.

TABLE 2

Examples of nanofibers used in the formation of 3D networks

| | |
|---|---|
| 1 | Polysaccharide nanofibers |
| 2 | Cellulose nanofibers |
| 3 | Chitin nanofibers |
| 4 | Chitosan nanofibers |
| 5 | Polysaccharide nanofibrils |
| 6 | Polysaccharide nanostrips |
| 7 | Cellulose nanostrips |
| 8 | Carbon nanofibers |
| 9 | Carbon nanotubes |
| 10 | Porous graphene nanosheets |
| 11 | Porous graphene oxide nanosheets |
| 12 | Bacterial cellulose |
| 13 | Inorganic nanofibers |
| 14 | Inorganic nanotubes |
| 15 | Inorganic nanowires |
| 16 | Metal nanowires |
| 17 | Metal nanofibers |
| 18 | Synthetic nanofibers |
| 19 | Man-made nanofibers |
| 20 | Any other nanofibers/nanotubes/nanowires |
| 21 | Combinations of above materials (1-20) |

In embodiments, suitable nanofibers may be formed of cellulose, chitosan, collagen, gelatin, chitin, hyaluronic acid, polysaccharide nanofibrils, polysaccharide nanostrips, cellulose nanostrips, carbon nanofibers, carbon nanotubes, porous graphene nanosheets, porous graphene oxide nanosheets, bacterial cellulose, inorganic nanofibers, inorganic nanotubes, inorganic nanowires, metal nanowires, metal nanofibers, synthetic nanofibers, man-made nanofibers, any other nanofibers/nanotubes/nanowires, combinations thereof, and the like. Cellulose is the structural material of the primary cell wall of green plants and it is one of the most abundant materials on earth. Due to its excellent chemical, mechanical, thermal, and benign environmental properties, and its low cost of production, scientists have shown increasing interest in using it as a base material for different applications, such as heavy metal ion removal, virus and bacteria removal, basic dye adsorption, nanocomposites, nanopapers, gas/water barrier layers, nano-templates, and tissue engineering. Conventional fabrication of cellulose nanofibers involves an acid/alkali treatment, followed by a grinder/fluidizer defibrillation process, where the fiber length (several micro-meters) to diameter (few tens to few hundred nanometers) ratios are relatively small and non-uniform. Typically, highly corrosive chemicals have to be used in the initial step of the chemical treatment.

In embodiments, cellulose may be used to prepare the nanofiber layer for application to the substrate. Cellulose nanofibers can be prepared according to the procedure described in WO2010/042647, the disclosure of which is incorporated by reference herein in its entirety. For example, in embodiments a cellulose nanofiber aqueous solution at a concentration from about 0.001 weight % to about 0.40 weight %, in embodiments from about 0.05 weight % to about 0.1 weight %, may be applied to a substrate of the present disclosure. The cellulose nanofiber solution is infused into the substrate by the application of from about 0.1 pounds per square inch (psi) to about 20 psi of pressure, in embodiments from about 1 psi to about 10 psi of pressure, in embodiments about 2 psi of pressure from a gas tank. The infusion procedure can also be accomplished by applying vacuum through the opposite side of the substrate of the present disclosure in direct contact with a cellulose nanofiber aqueous solution. The substrate is then dried in an oven at a suitable temperature of from about 25° C. to about 200° C., in embodiments from about 50° C. to about 150° C., in embodiments about 100° C., for a suitable period of time, in embodiments from about 5 minutes to about 40 minutes, in embodiments from about 10 minutes to about 30 minutes, in embodiments about 20 minutes.

Other methods for forming cellulose nanofibers include electro-blowing methods disclosed in WO 2007/001405 and U.S. Patent Application Publication No. 2005/0073075, the entire disclosures of each of which are incorporated by reference herein.

Conventional electrospun membranes have only a quasi-3-dimensional structure, since compaction in the thickness direction of the membrane occurs due to the need to withstand pressures along the membrane thickness. However, for gas (or air) filtration, especially for use in face masks, the required pressure for comfortable breathing is very low (less than 100 Pa). Thus, the fabrication of a 3D network structure can be used to relax the need for compaction in the thickness direction of the membrane. While this can be achieved by electro-spinning of fibers to form a loose format, e.g., by introducing electrostatic interactions, the present disclosure is more natural based on fundamental principles. According to the Doi-Edward theory, entanglements among rods occur when the number concentration exceeds $1/L^3$ with L being the length of the rod.

Thus, very loose 3D structures can be formed in a rod suspension. For example, in embodiments, oxidation procedures to generate ultra-fine nanofibers, in embodiments, cellulose nanofibers, include the following. An aqueous oxidation system, as an illustration, based on TEMPO (2,2,6,6-tetramethylpiperidinooxy)/NaBr/NaClO may be used to generate carboxylate groups which are negatively charged on the surface of polysaccharide. The negatively charged polysaccharide nanofibers can be produced by mechanical treatment and dispersed in water with desired concentrations.

For example, a wood pulp, such as commercially available Biofloc 92 MV wood pulp (from Tembec Tartas, France) may be used to prepare cellulose nanofiber suspensions. The wood pulp, sodium bromide, and (2,2,6,6-tetramethylpiperidinooxy) (TEMPO) are mixed in water. Amounts of wood pulp may be from about 1% by weight of the reaction mixture, in embodiments from about 0.0001 to about 10% by weight of the reaction mixture; amounts of sodium bromide may be from about 0.001% by weight of the reaction mixture, in embodiments from about 0.000001 to about 0.1% by weight of the reaction mixture; amounts of TEMPO may be from about 0.0002% by weight of the reaction mixture, in embodiments from about 0.0000002 to about 0.02% by weight of the reaction mixture; and amounts of water may be from about 99% by weight of the reaction mixture, in embodiments from about 90% to about 99.999% by weight of the reaction mixture. The reaction is started by adding sodium hypochlorite solution (10 to about 13% aqueous solution) in amounts from about 7.5% by weight of the reaction mixture, in embodiments from about 0.0075% to about 75% by weight of the reaction mixture, under stirring for an appropriate time, in embodiments about 24 hours. The pH value should be from about 10.0 to 10.3, monitored with a pH meter, and kept at that level by adjusting with sodium hydroxide aqueous solution. The reaction can be stopped by adding ethanol followed by stirring.

Using the above method, C6-hydroxyl group can be oxidized into carboxylate groups. The final oxidized cellulose can be separated by centrifuging the reaction mixture, followed by washing with deionized (DI) water and then separating again by centrifugation. The oxidized cellulose slurry may then be dispersed in water and sonicated with a homogenizer (Cole Parmer, VCX-400). The suspension may then be again centrifuged and the recovered supernatant includes the cellulose nanofiber aqueous suspension.

In a similar fashion, the aqueous oxidation system based on TEMPO/NaBr/NaClO may also be used and employed to fabricate various types of ultrafine chitin nanofibers and nanowhiskers.

In some embodiments, the cellulose nanofibers (CN) have a diameter of from about 3 nm to about 50 nm, in embodiments from about 4 nm to about 20 nm, in embodiments about 5 nm, and a length of from about 50 nm to about 10000 nm, in embodiments from about 100 nm to about 2000 nm, in embodiments about 500 nm.

In embodiments, the nanofibers prepared by this method possess very fine and uniform diameters (e.g., 5-10 nanometers) when compared with conventionally prepared nanofibrils. Moreover, the surface of these ultrafine cellulose nanofibers is covered with negatively charged carboxylate groups as well as aldehyde groups, generated by the oxidation of C6-hydroxyl groups, enabling them to be used for different applications.

In embodiments, the membrane of the present disclosure is modified by infusing or depositing ultra-fine nanofibers, in embodiments polysaccharide nanofibers, into or onto the substrate layer. In embodiments, the fine fibers are nanofibers.

As noted above, these cellulose nanofibers may be infused into, or deposited onto, the substrate layer. The cellulose nanofibers may then be subjected to cross-linking and/or surface chemical modification approaches.

Suitable cross-linking and/or surface chemical modification approaches for modifying the cellulose nanofibers include, for example, the application of heat, the use of chemical crosslinking agents, oxidation, plasma treatment, reduction, grafting, coupling, polymerization, condensation, combinations thereof, and the like.

Crosslinking may be conducted using methods within the purview of those skilled in the art, including the use of crosslinking agents. Suitable crosslinking agents include, but are not limited to, glyoxal, epichlorohydrin, polyacrylic acid, polyvinylamine hydrochloride, glutaraldehyde, 1,4-butanediol diglycidyl ether, formaldehyde, glyoxylic acid, oxydisuccinic acid, citric acid, polyethylenimine, polyvinyl alcohol, trimesoyl chloride, maleic anhydride, phosphorus oxychloride (phosphory chloride), trimetaphosphate, linear mixed anhydrides of acetic and di- or tribasic carboxlic acids, vinyl sulfone, diepoxides, cyanuric chloride, aldehydes (acetaldehyde, acrolein), combinations thereof, and the like. Other suitable crosslinking methods include conventional thermal-, radiation- and photo-crosslinking reactions within the purview of those skilled in the art. Two important criteria for the selection of a crosslinking agent or method are as follows: (1) the crosslinking agent or method should not dissolve the material being crosslinked, and (2) the crosslinking agent or method should not induce large dimensional change in the material being crosslinked.

The amount of crosslinking agent added to the nanofibers, such as cellulose nanofibers, may vary, from about 0.1 to about 10 percent by weight of the combined crosslinking agent and cellulose nanofibers, in some embodiments from about 0.5 to about 5 percent by weight of the combined crosslinking agent and cellulose nanofibers.

The thickness of the 3D network layer, in embodiments formed of cellulose nanofibers, may vary from about 20 nm to about 5000 µm, in embodiments from about 100 nm to about 1000 µm, in embodiments from about 500 nm to about 100 µm in thickness.

The thickness of the filtration membrane, including the 3D network layer and substrate, may vary from about 0.1 µm to about 10000 µm, in embodiments from about 1 µm to about 5000 µm, in embodiments from about 10 µm to about 500 µm in thickness.

The filtration membrane possesses pores or voids which assist in the functioning of the membranes of the present disclosure. The diameter of these voids may be from about 10 nm to about 200 µm, in embodiments from about 50 nm to about 30 µm, in embodiments from about 100 nm to about 10 µm. In some embodiments, the pore size may be from about 0.2 µm to about 0.6 µm.

In embodiments, the substrate may be subjected to a plasma treatment to enhance its adherence to a 3D polymer network for forming a filtration membrane of the present disclosure. Plasma treatment methods are within the purview of those skilled in the art, including, for example, atmospheric pressure plasma treatment on non-woven fabrics. This method has been demonstrated to be an effective means to improve the wettability as well as the affinity of the substrate surface for dyeing, chemical grafting and substrate adhesion. Plasma activation can produce functional groups and/or free radicals on the substrate surface, which can react with other molecules.

In one embodiment, a plasma treatment may be conducted as follows. The surface of a substrate can be functionalized by subjecting it to an atmospheric-pressure plasma treatment using a surface dielectric barrier discharge in nitrogen gas, ambient air, or other gases such as helium, ammonia, oxygen and/or fluorine. The resulting plasma-activated substrate may be bound to a layer including cellulose nanofibers using a catalyst-free solution of water in combination with polysaccharides such as cellulose. The plasma treatment can significantly improve the adhesion of a substrate with other layers of the membrane, including any cellulose nanofibers of the present disclosure or other layer utilized in the formation of membranes of the present disclosure.

As noted above, the substrate and 3D nanofibrous layer may form a layered structure suitable for use as a filtration membrane. The layered structures are, in embodiments, in a 1-2-1 format, though not limited to the 1-2-1 configuration, where: (1) is a highly porous substrate, e.g., an ionic liquid-modified melt-blown polyethylene (PE)/polypropylene (PP) substrate of very high porosity, employed to enhance the surface charge density of the membrane; and (2) is a highly porous barrier layer of a 3-dimensional (3D) functionalized nanofibrous network structure that can be fabricated with cellulose nanofibers followed by different cross-linking and surface chemical modification approaches.

The new gas (or more specifically, air) filter is based on several principles. High flux (for air) in a non-woven matrix is of primary importance. Its main controlling factor is largely depending on the amount of materials in the porous network structure, i.e., the porosity. In other words, the higher the porosity, the higher the flux (or throughput). Effective pore size of the non-woven matrix (at constant fraction of materials per bulk volume) depends on the fiber diameter.

Together with surface functionalization of fibers forming the network structure, the present disclosure provides a platform to tailor design air (or gas) filters that can selectively exclude contaminated air (or gas) ingredients by either size exclusion or adsorption, together with high enough throughput for effective air (or gas) mask usage or filtration filters that can be more energy efficient because of the higher throughput.

To achieve the above goals, the following advantages have been combined: Plant/animal-based nanofibers (e.g., cellulose or chitin, whose fiber cross-sections are in the nanometer size range, from nanometers to tens of nanometers, and covering a range not easily accessible by using electro-spinning technology, and whose (nanofiber) lengths can be manipulated by considering the nature of the source materials and mechanical processing conditions), can be used to effectively increase the porosity with essentially the same pore size as membranes prepared by electro-spinning, because of their smaller size fiber diameters and 3D morphology, resulting in higher fluxes. Electro-spun membranes have a quasi-3D morphology, while rod-like cellulose fibers have the ability to form both quasi-3D and 3D membranes, with membranes having 3D morphology having a higher porosity and, thus, higher flux.

With the same fiber diameter, the porosity can be changed (i.e., the amount of materials in the membrane) by changing the concentration of rod suspensions and thereby changing the pore size, i.e., with more fibers per bulk volume, the pore sizes will decrease. This capability has not been easily achieved by means of electro-spinning technology.

For air (or gas) filtration, with less need to withstand pressures in the direction of membrane thickness, methods to fabricate 3D structures are utilized to take advantage of cross-linking reactions on the nanofiber surface, e.g., by heat or radiation, as the 3D network is being deposited onto the substrate matrix, which can be in the form of appropriate (coated) porous paper-like substrates or PE/PP fibrous mats.

The cellulose-based nanofibers can be functionalized by chemical means, much easier than typical synthetic polymer-based electro-spun membranes. Super-hydrophobic or super-hydrophilic membranes can be fabricated, together with means for virus or toxic metal removal. It should also be noted that a composite suspension could be developed to change the rigidity or elasticity of the 3D network.

The membranes of the present disclosure and methods for their production are cost-effective, with higher flux and diverse functionality to be very competitive in the air (or gas) filtration business. They can address different requirements for air (or gas) filtration. In addition they take advantage of green chemistry and use one of the most abundant sustainable materials, cellulose-based materials.

Advantages of the new type of air filtration membranes based on a 3D nanofibrous network barrier layer and a charged supporting PE/PP substrate include the following.

The novel gas (or air) filtration membrane with 3D nanofibrous network as the barrier layer can exhibit higher flux and higher separation performance.

The porosity of the 3D barrier layer can be as high as 99% (being limited only by the mechanical strength as needed for a specific application) and can be maintained in performing gas (or air) filtration; meanwhile, the effective pore size for the barrier layer can be adjusted for different applications.

The surface of the gas (or air) filtration membrane can be easily functionalized by taking the advantages of cellulose chemistry, and can be designed for different targets, such as removal of aerosols, toxic fumes, or gases.

A porous substrate fabricated from oxidized cellulose pulps, which exhibits not only excellent mechanical properties but also has a functional surface (e.g., negatively charged surface) which can enhance the filtration efficiency. Moreover, the pore size of the porous substrate can be tuned.

The fabrication of the above gas (or air) filtration membranes can be flexibly designed either in a two-layered structure or a three-layered sandwich structure.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 30° C.

EXAMPLE 1

For oxidized cellulose slurry preparation, Biofloc 96 MV wood pulp (6.0 grams) was dispersed in water (700 grams). Both sodium bromide (0.60 grams) and TEMPO (0.12 grams) were dissolved in the suspension. The reaction was started by the addition of a desired amount of sodium hypochlorite solution (1.5 grams, 3.0 grams or 6.0 grams, these 3 different slurries are hereby referred to as SH1.5, SH3.0 and SH6.0, respectively) under stirring for 24 hours. The pH was kept between 10-11, being monitored with a pH meter and adjusted with sodium hydroxide aqueous solution (1 mol/L). The reaction was stopped by adding ethanol (20 ml) under stirring for 20 min. The cellulose slurry was treated with dialysis by using a semipermeable regenerated cellulose membrane (6000-8000 MWCO, Fisher Scientific) for 3 days to remove the unwanted ions from the slurry. The final product was separated by centrifuging the mixture at about 6000 g for 10 minutes. Oxidized cellulose slurry (17.5 grams) was dispersed in 150 grams of water and sonicated for 5 minutes with a homogenizer (Cole Parmer, VCX-400) that had a 0.5 inch tip diameter and was operated at an amplitude of 80%. The concentration of the final cellulose slurry was 0.75 weight %. The oxidized cellulose slurry (25 ml) was casted on a supporting layer (polypropylene mesh, Textile Development Associates, Inc.) by using a vacuum filtration method. The porous paper was formed and dried in a vacuum oven before it was peered from the filter.

An attenuated total reflectance (ATR) spectrometer was employed to examine the functional groups of the porous 'paper' made by the oxidized cellulose slurries from Biofloc 96 MV wood pulp described above in Example 1. FIG. 1 is the ATR spectrum of the porous substrate.

Looking at FIG. 1, the peak at 1600.84 $cm^{-1}$ position represents the C=O group of the carboxylate group, which showed that the cellulose were successfully oxidized.

Figure 2:
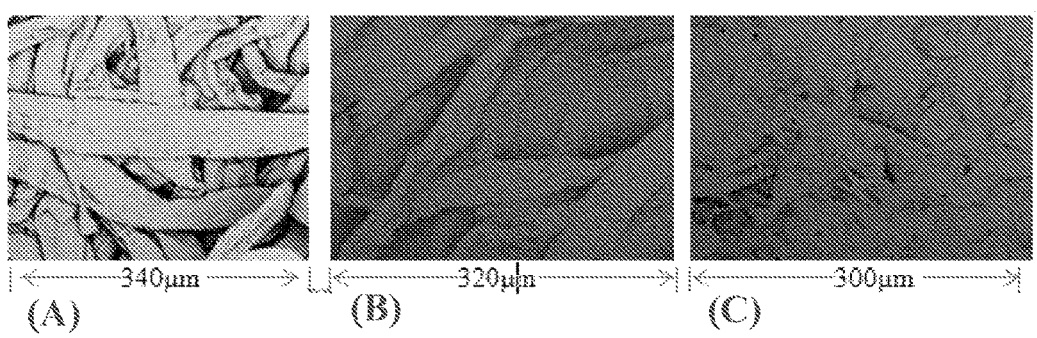
FIG. 2 are SEM images of the top views of commercially available Biofloc 96 MV wood pulp (FIG. 2A), a paper-like substrate made from cellulose slurry SH3.0 (including 3 grams of sodium hypochlorite solution) (FIG. 2B), and paper-like substrate made from cellulose slurry SH6.0 (including 6 grams of sodium hypochlorite solution) (FIG. 2C)

SEM images of membranes produced in Example 1 are set forth in FIG. 2. FIG. 2 shows the SEM images of the top views of the Biofloc 96 MV wood pulp (FIG. 2A), paper-like substrate made from SH3.0 (FIG. 2B), and paper-like substrate made from SH6.0 (FIG. 2C).

As can be seen from FIGS. 2A-2C, the surface of the Biofloc 96 MV wood pulp was covered with large fibers. The surface of membranes from SH3.0 and SH6.0 were covered by both small fibers and large fibers but a larger amount of large diameter fibers was present on the surface of the membrane from SH3.0. This can be explained by the degree of oxidation. When the cellulose slurry was more oxidized, many larger diameter fibers would break into smaller fibers. Thus, the membranes made from the more oxidized solution would be covered with smaller fibers in comparison to the membrane fabricated from less oxidized cellulose slurry.

Figure 3:
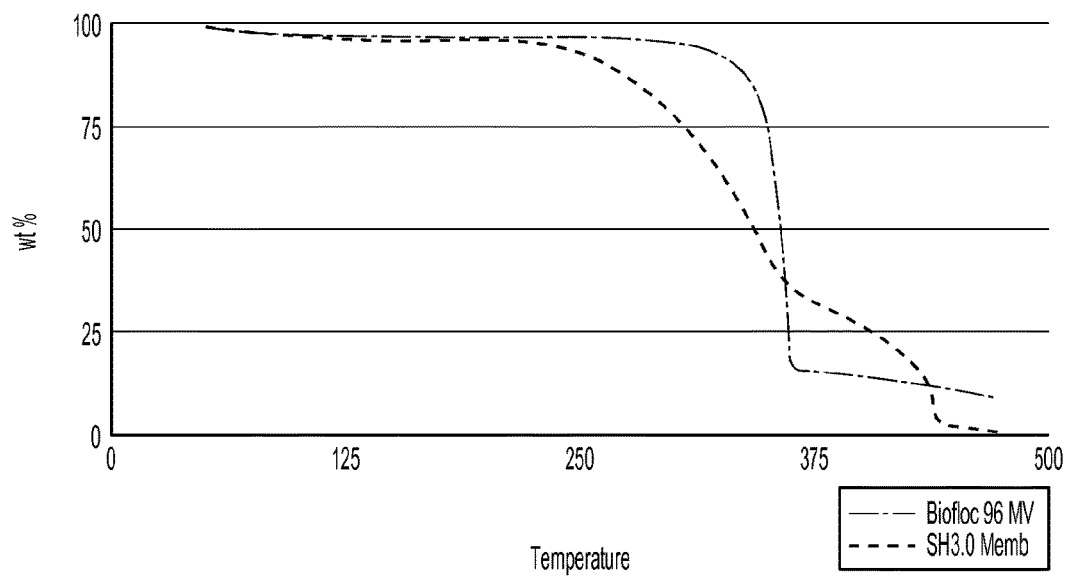
FIG. 3 is a plot of thermogravimetric analysis (TGA) scans of Biofloc 96 MV wood pulp and the porous paper-like substrate made from SH3.0.

Biofloc 96 MV wood pulp and the porous paper fabricated from SH3.0 were analyzed using Thermogravimetric analysis (TGA). FIG. 3 includes the TGA scans of Biofloc 96 MV wood pulp and the porous paper fabricated from SH3.0. In FIG. 3, it can be seen that the mass of the Biofloc 96 MV wood pulp decreased dramatically when the temperature reached about 350° C., and the mass of the SH3.0 membrane started to decrease when the temperature reached about 260° C. This behavior can be explained by the different functional groups in each material. Biofloc 96 MV wood pulp had carboxylate groups after oxidation. In the thermal scan process, the COOH group would easily release $CO_2$ gas, resulting in the destruction of the structure.

The amount of negatively charged carboxylate groups present in the oxidized cellulose slurries was determined by conductivity titration. Table 3 below lists the amount of carboxylate groups (normalized by the weight of membrane) present in the 3 different oxidized cellulose slurries.

TABLE 3

Amount of carboxylate groups in different oxidized cellulose slurries

| Oxidized cellulose slurry | SH1.5 | SH3.0 | SH6.0 |
|---|---|---|---|
| Carboxylate groups (mmol/g) | 0.13 | 0.32 | 0.67 |
| Mean pore size of porous papers (μm) | 11.9 | 19.1 | 5.7 |

As expected, the amount of the sodium hypochlorite that was added to the initial oxidation reaction determined the degree of oxidation. Meanwhile, the pore size of the porous paper was as low as 5.7 μm, which was much smaller than the diameter and the length of the fibers in the 3D cellulose nanofibrous network. Therefore, the porous cellulose paper can be used effectively as a substrate for the 3D nanofiber-based air (or gas) filter.

EXAMPLE 2

Fabrication of a substrate occurred by incorporation of ionic liquid, 1-docasanyl-3-methylimidazolium bromide (C22Br), into conventional materials such as polyethylene (PE, $M_w$=4000 Da) or polypropylene (PP) (See, e.g., U.S. Pat. Nos. 8,211,958 and 8,563,657). The experimental details were as follows. To 2 grams of PE powder, a desired amount of C22Br was added, and the mixture was heated at 130° C. for 1 hour. After having been totally dissolved, the melted mixture of C22Br and PE was cooled down to room temperature for further use. The composition ratios of C22Br to PE are listed in Table 4 below.

TABLE 4

Composition of mixture of PE and C22Br

| Samples ID (No) | Ratio of C22Br to PE |
|---|---|
| PE | 0 |
| C22Br-PE-0.5 | 0.5:100 |
| C22Br-PE-5 | 5.0:100 |
| C22Br-PE-20 | 20:100 |
| C22Br-PE-100 | 100:100 |

The above samples were melt-pressed into a flat film using a hot-press instrument (Carver). The temperature was set at 138° C. and the pressure at 2000 psi. The sample was maintained at 138° C. for 10 minutes and cooled down to room temperature afterwards. The sample surface area was 3.0×3.6 mm and the thickness of the film was 130 microns. The composite samples could be melted at 130° C. and injected by using a syringe (spinneret) to form fibers with a diameter of about 500 μm.

Figure 4:
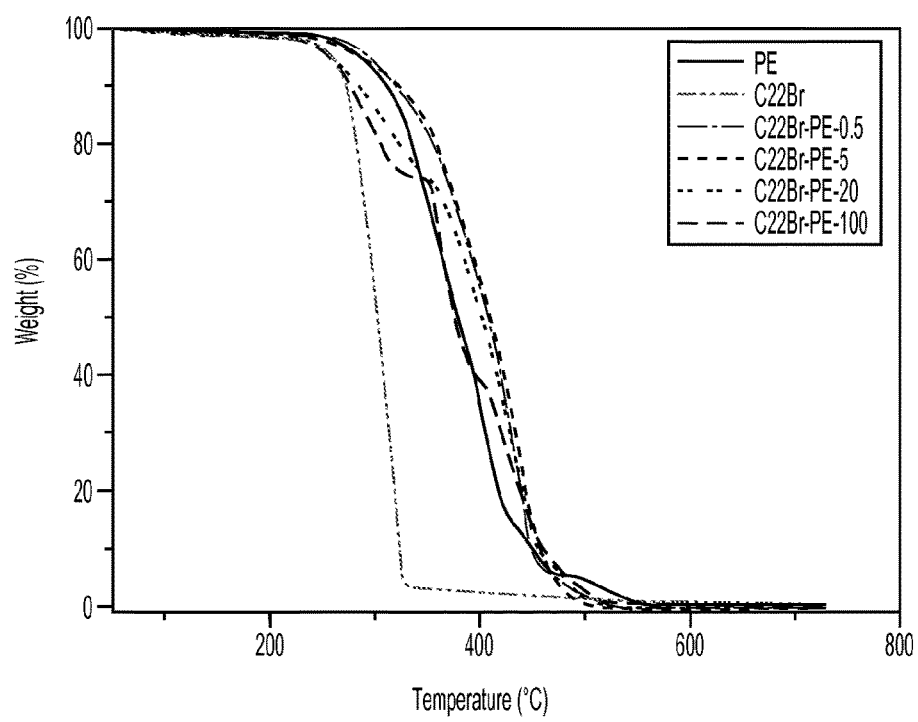
FIG. 4 plots % weight versus temperature for different samples of PE-C22Br (polyethylene functionalized with 1-docasanyl-3-methylimidazolium bromide) composites of the present disclosure.

Thermal gravimetric analysis (TGA) scans of different samples were carried out at 10° C./min, from 60° C. to 800° C. and under an air flow rate of 20 mL/minute, by using the TGA7 instrument from Perkin-Elmer Inc. FIG. 4 shows plots of % weight versus temperature for different samples.

All composites started to decompose at 250° C., implying the high thermal stability of PE-C22Br composites. Typically, the melt-blowing of PE could be carried out in the range of 150 to 200° C. The incorporation of C22Br was not hindered by the melt-blowing operation. Meanwhile, the ionic liquid C22Br could serve as a plasticizer for PE, actually improving the spin-ability of PE.

Figure 5:
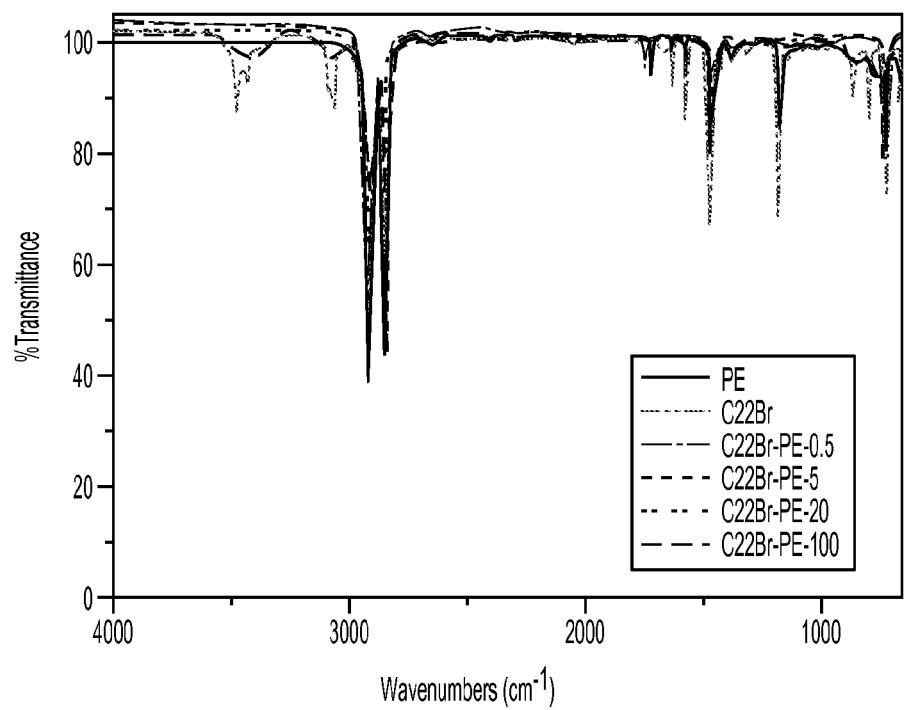
FIG. 5 are ATR spectra the PE-C22Br composites.

To determine the compatibility of C22Br and PE in the composite films, FTIR (attenuated total reflectance (ATR) accessory, Nicolet iS10 spectrophotometer, Thermo Scientific, Inc.) was used, with spectra of the PE-C22Br composites, as shown in FIG. 5.

The absorbance peak of imidazolium, located at 3429-3474 $cm^{-1}$, could be observed in the spectra of C22Br-PE composites, indicating a successful blending process. Meanwhile, the compatibility of C22Br and PE were very even when the content of C22Br was less than 20%.

Figure 6:
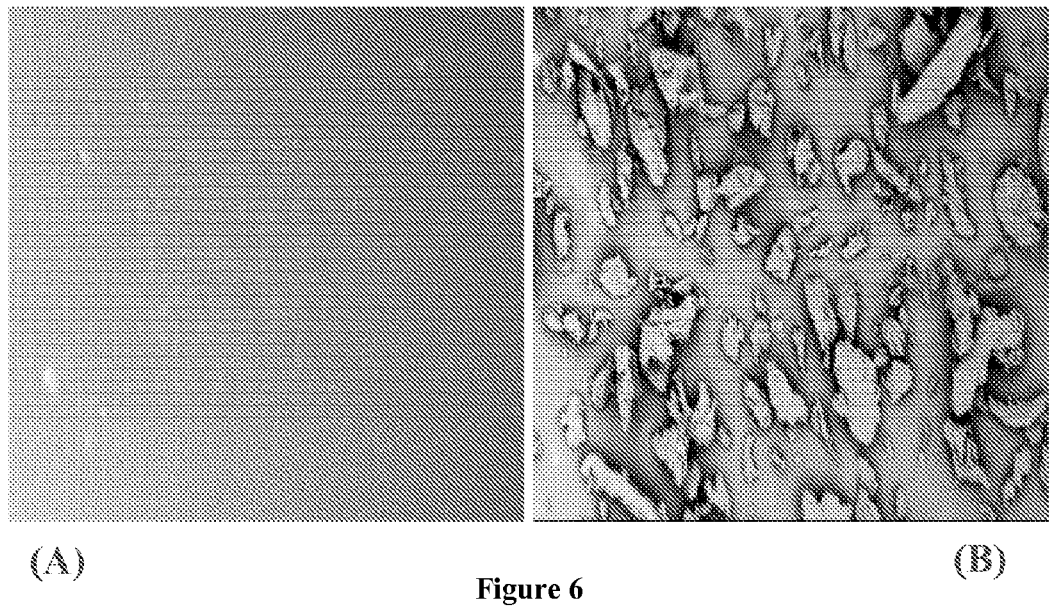
FIG. 6 are SEM images of PE-C22Br-5 composite fiber before (FIG. 6A), and after (FIG. 6B), adsorption of alginic acid sodium salt particles.

The electrically charged surface of the C22Br-PE-5 composite was confirmed by an adsorption behavior of particles (Alginic acid sodium salt powder, negatively charged) on the fiber surface of the composites, which was observed by SEM, as shown in FIG. 6. FIG. 6 includes SEM images of PE-C22Br-5 composite fiber before (FIG. 6A) and after (FIG. 6B) adsorption of alginic acid sodium salt particles.

As is apparent from FIGS. 6A and 6B, the composite could adsorb a wide range of particles from 500 nm to 20 μm. Therefore, the PE-C22Br composite could be an adsorbent with high adsorption capability.

PE and PE-C22Br composites were placed in AgNO3 solution (0.5 weight %) for 24 hours. It was observed that the AgBr precipitant was generated on the surface of PE-C22Br-20 in the $AgNO_3$ solution after 24 hours, confirming that the ionic liquid C22Br had been immobilized on the surface of PE-C22Br-20 where bromide anions reacted with $AgNO_3$. No precipitant was observed on the surface of PE-C22Br-5 and PE-C22Br-0.5. However, the surface became dark when compared with that of pure PE, indicating the generation of AgBr. Therefore, the surface of PE-C22Br had positive charges which could be used to enhance the adsorption capacity of the air filtration membrane.

EXAMPLE 3

Wood pulp (Biofloc 92 MV, supplied by the Tembec Tartas factory in France) was used to prepare cellulose nanofiber suspensions. The details were as follows. About 2.0 grams of wood pulp, 0.20 grams of sodium bromide, and 0.04 grams of TEMPO were mixed in 192 grams of water. The reaction was started by adding 15 grams of sodium hypochlorite solution (10 to about 13% aqueous solution) under stirring for 24 hours. The pH value was kept at about 10.0 to 10.3, monitored with a pH meter by adjusting with sodium hydroxide aqueous solution (0.5 mol/L). The reaction was stopped by adding ethanol (10 mL) followed by stirring for 20 minutes. The final oxidized cellulose was separated by centrifuging the reaction mixture at 1960 g, followed by washing with deionized (DI) water 5 times and then separating again by centrifugation. A desired amount of oxidized cellulose slurry was dispersed in 100 grams of water and sonicated for 5 minutes with a homogenizer (Cole Parmer, VCX-400) which had a 0.5-inch tip diameter, and was operated at an output power of 320 watts. The suspension was centrifuged at 1960 g and the recovered supernatant became the cellulose nanofiber aqueous suspension with concentrations of 0.025, 0.05, and 0.15 weight %.

15 mL of the above cellulose nanofiber suspension at different concentrations of 0.025, 0.05, and 0.15 weight % was freeze dried (Millrock Technology, BT-53 freeze dryer) for 3 days. The samples were labeled as B-92-CN-0.025, B-92-CN-0.05, and B-92-CN-0.15, respectively.

EXAMPLE 4

70 mL of toluene, 50 mL of acetic acid (glacial), 0.55 g of perchloric acid, and 25 mL of acetic anhydride were mixed vigorously for 10 minutes. About 0.012 grams of B-92-CN-0.05 was added into the mixture, and the whole reaction system was set for 24 hours. The final esterified cellulose nanofiber scaffolds were washed 5 times with DI water.

Figure 7:
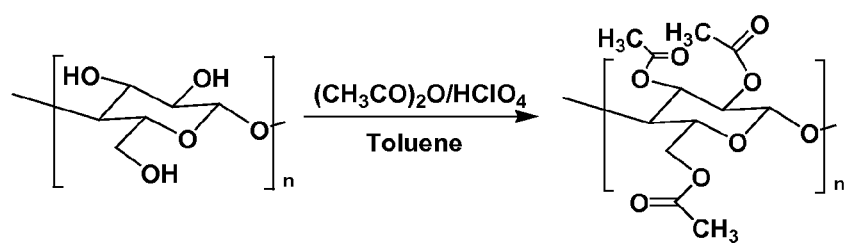
FIG. 7 depicts the esterification of the surface of cellulose nanofibers in accordance with the present disclosure.

70 mL of toluene, 50 mL of acetic acid (glacial), 0.60 grams of perchloric acid, and 30 mL of acetic anhydride were mixed vigorously for 10 minutes. About 0.014 grams of B-92-CN-0.15 was added into the mixture, and the whole reaction system was set for 1 hour. The final esterified cellulose nanofiber scaffold was washed with deionized (DI) water 5 times. The reaction, where esterification of the surface of the cellulose nanofibers occurred, is depicted in FIG. 7.

Figure 8:
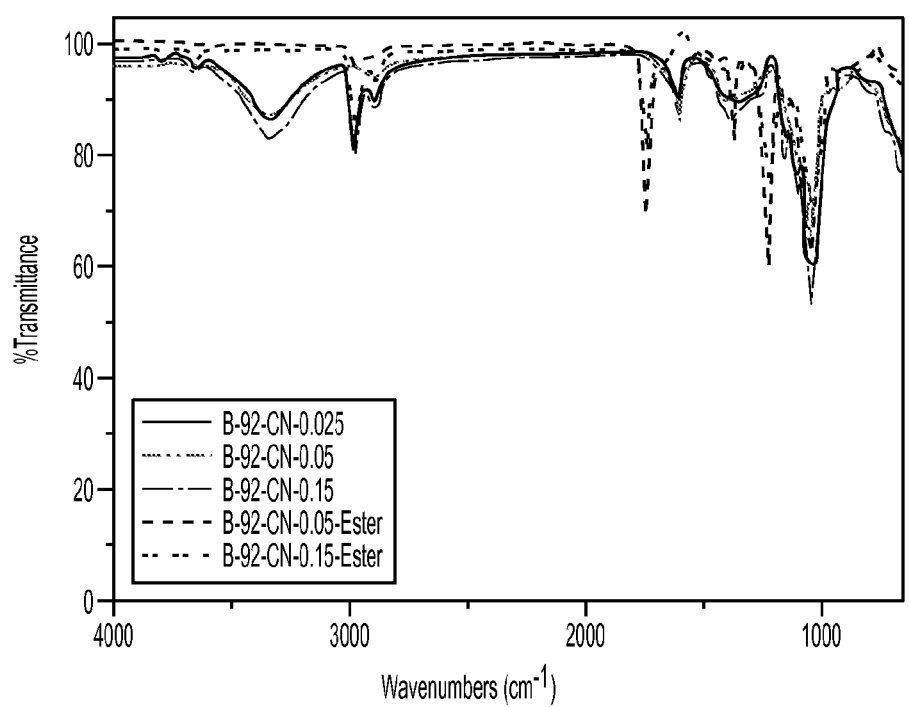
FIG. 8 includes ATR spectra of cellulose nanofibers before and after esterification.

ATR was employed to confirm the reaction had occurred. FIG. 8 includes ATR spectra of cellulose nanofibers before and after esterification.

From FIG. 8, the peak at 3341 $cm^{-1}$ assigned as the hydroxyl group of cellulose in the spectrum of B-92-CN-0.05 disappeared in the spectrum of B-92-CN-0.05-Ester. Meanwhile, the peak at 1743 $cm^{-1}$ which was assigned to the carboxylate group appeared, indicating the successful esterification reaction of the cellulose in the acetic anhydride/perchloric acid solution system. Moreover, the difference in the concentrations of the cellulose nanofiber suspensions did change the properties of the dried cellulose nanofiber scaffolds as confirmed by the identical ATR spectra.

The esterification reaction was also confirmed by measurements of the water contact angle. The water contact angle data of freeze dried cellulose nanofibers before and after esterification were about 10° and 125°, respectively, suggesting that the surface of cellulose nanofibers had been highly esterified, i.e., the degree of substitution was very high. As a result, the surface of modified cellulose nanofiber scaffolds became very hydrophobic, which could play an important role in air filtration performance.

Figure 9:
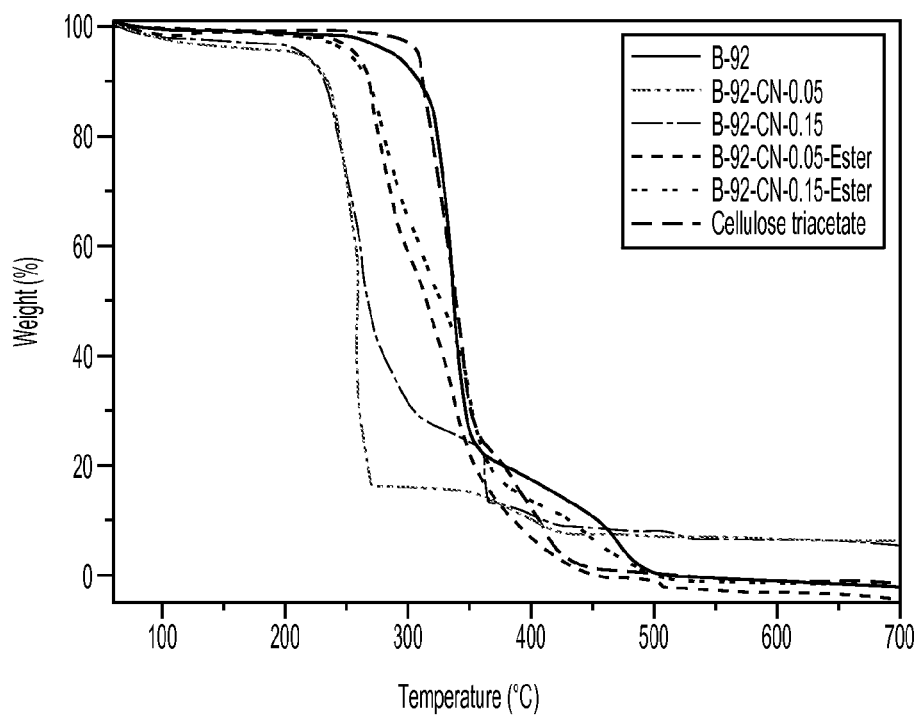
FIG. 9 are TGA scans showing the thermal stability of the samples of wood pulp and cellulose nanofibers before and after esterification.

The thermal stability of the samples of wood pulp and cellulose nanofibers before and after esterification was investigated with TGA, with the TGA scans shown in FIG. 9.

As can be seen in FIG. 9, the original wood pulp had higher thermal stability than that of cellulose nanofibers fabricated from the oxidation/mechanical process. However, the thermal stability increased after esterification of cellulose nanofibers. It should be noted that the esterification of cellulose nanofibers only happened on the surface, because the thermal stability of esterified cellulose nanofibers was between cellulose nanofibers and cellulose triacetate.

Figure 10:
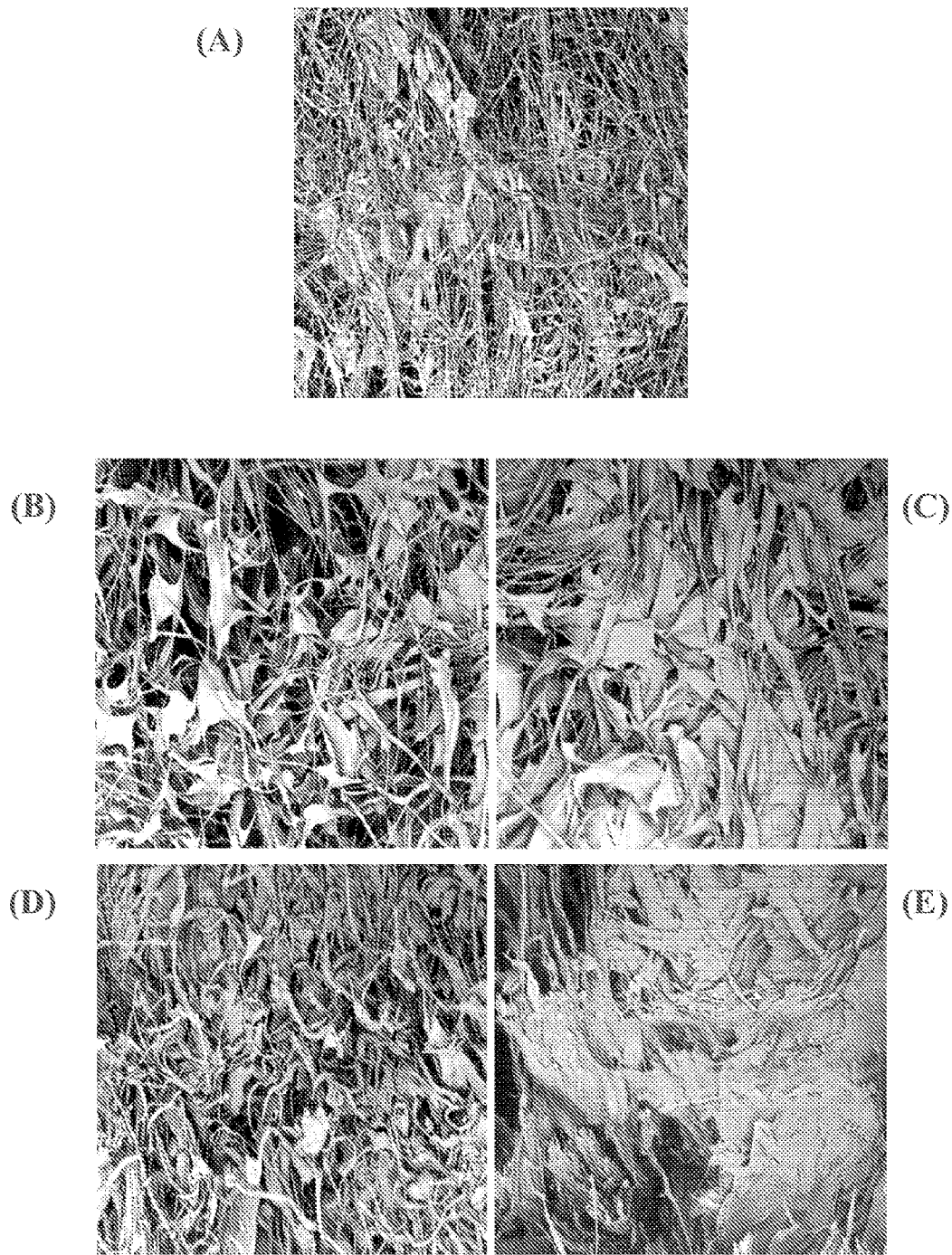
FIG. 10 includes SEM images of cellulose nanofibers B-92-CN-0.025 (FIG. 10A), B-92-CN-0.05 (FIG. 10B), B-92-CN-0.15 (FIG. 10C), and esterified cellulose nanofibers B-92-CN-0.05-Ester (FIG. 10D), and B-92-CN-0.15-Ester (FIG. 10E)

The morphology of freeze dried cellulose nanofiber scaffolds and esterified cellulose nanofiber scaffolds were studied with SEM, as shown in FIG. 10. FIG. 10 includes SEM images of cellulose nanofibers B-92-CN-0.025 (FIG. 10A), B-92-CN-0.05 (FIG. 10B), B-92-CN-0.15 (FIG. 10C), and esterified cellulose nanofibers B-92-CN-0.05-Ester (FIG. 10D), and B-92-CN-0.15-Ester (FIG. 10E).

3D nanofibrous structure of cellulose nanofiber mats could be formed after freeze-drying. From images (FIG. 10A), (FIG. 10B), and (FIG. 10C), it is seen that the increase in the concentration of cellulose nanofiber suspension increased the aggregation structure of cellulose nanofibers during the drying process. As a result, the mechanical properties of the cellulose nanofiber scaffolds should be enhanced. The pore size of the nanofiber scaffolds could be adjusted based on the concentration. However, the cellulose nanofiber scaffolds fabricated from the freeze drying process was very sensitive to moisture, which limited practical applications. From images of FIGS. 10(E) and (F), the morphology of cellulose nanofiber scaffolds did not change much after esterification. However, water resistance of nanofiber scaffolds could be dramatically increased, as measured from water contact angle data. As expected, the structure of esterified cellulose nanofiber scaffolds was very stable in air. Therefore, the esterification can be regarded as one approach of immobilizing the 3D structure of cellulose nanofiber scaffolds.

The porosity of the fibrous mat is a key parameter for high flux and low resistance properties, for either air or water filtration. Therefore, the porosity of 3D cellulose nanofiber scaffolds was determined. The porosity of a mat was defined as the volume of the pores divided by the total volume of the membrane. It can be determined by gravimetric method, measuring the weight of porofil (a wetting fluid, QuantaPhi Corp.) contained in the membrane pores, as shown below in Table 5.

TABLE 5

Porosity of cellulose nanofiber scaffolds before and after esterification

| Sample # | Porosity (%) |
|---|---|
| B-92-CN-0.025 | 99.6 |
| B-92-CN-0.05 | 99.5 |
| B-92-CN-0.15 | 99.5 |
| B-92-CN-0.05-Ester | 99.1 |
| B-92-CN-0.15-Ester | 99.1 |

A very high porosity of cellulose nanofiber scaffolds, as high as 99.6%, was achieved by using the freeze drying method. After esterification, porosity higher than 99.0% can be fabricated, indicating that the 3D cellulose nanofiber scaffolds can be used as a very efficient barrier layer for air filtration with a very high throughput.

The pore size of the nanofiber scaffolds can be adjusted based on the fiber suspension concentration during fiber network processing for different applications. Pore sizes will be affected by two factors: the fiber concentration in the suspension and fiber aggregation. An increase in the fiber concentration will decrease the effective pore size of the nanofibrous scaffolds. On the other hand, the aggregation of cellulose nanofibers (e.g., induced by hydrogen bonding between the nanofibers in the suspension) should create larger diameter fibers which would tend to create larger effective pore sizes, due to an effective decrease in the number of fibers that can participate in forming the 3D network structure. Such effects can be utilized to partially control the effective pore size of the nanofibrous scaffolds at a fixed membrane thickness.

EXAMPLE 5

To further tune the pore size, cross-linkers such as epichlorohydrin, phosphorus oxychloride (phosphory chloride), trimetaphosphate, linear mixed anhydrides of acetic and di- or tribasic carboxlic acids, vinyl sulfone, diepoxides, Cyanuric chloride, aldehydes (formaldehyde, glutaraldehyde (GA), acetaldehyde, acrolein), can be used to immobilize spontaneously the 3D structure of the cellulose nanofiber scaffolds.

Among them, GA is a typical cross-linker for cellulose in an aqueous system (Chu et al., U.S. Pat. Application Publication No. 2011/0198282 A1). In detail, 0.05 weight % of cellulose nanofiber suspension (20 mL) and 0.15 mol/L of GA aqueous solution (0.2 mL) were mixed together and heated at 80° C. for 1 hour. The final product was dialyzed with pure water for 2 days and freeze drying (A vacuum freeze-dryer (MillRock Technology, BT53) was employed to freeze dry the samples. The temperature was set below −30° C. and the pressure was set below 430 mTor.).

It is clear that the cross-linker added in the nanofiber suspension can enhance the aggregation of cellulose nanofibers and form a dense barrier layer. Therefore, the combination of a cross-linker and freeze-drying approach can create a cellulose nanofiber barrier with a highly porous 3D structure and adjustable pore size, which indicated that the 3D cellulose nanofiber scaffolds can be used as a barrier layer for air filtration to get rid of airborne bacteria/viruses, harmful particles/dusts (such as particulate matter (PM2.5)), toxic gases, and liquid droplets.

EXAMPLE 6

Figure 11:
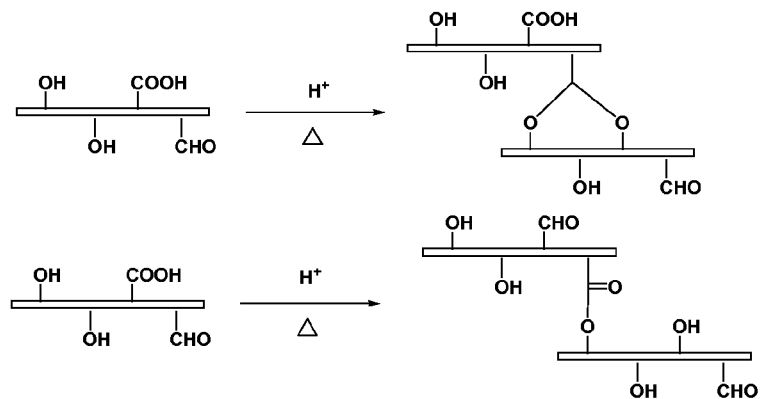
FIG. 11 demonstrates cross-linking reactions based on aldehyde groups and carboxylic groups located on the surface of cellulose nanofibers, as produced, for example, by using the TEMPO/NaBr/NaClO oxidizing system and heat.

A series of strategies were employed to achieve the cross-linking process. One simple way was to initiate, by heating, the cross-linking reaction based on aldehyde groups and carboxylic groups located on the surface of cellulose nanofibers, as produced, for example, by using the TEMPO/NaBr/NaClO oxidizing system. FIG. 11 shows possible cross-linking mechanisms using the heating process.

EXAMPLE 7

Figure 12:
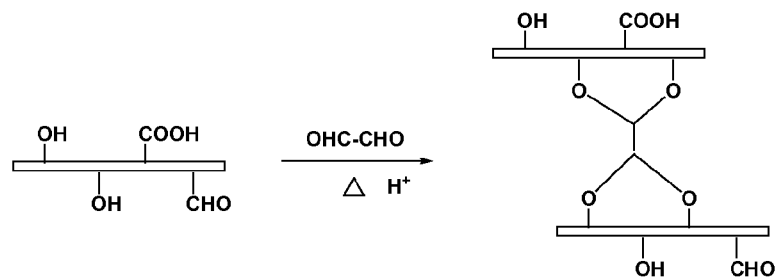
FIG. 12 demonstrates the cross-linking reaction where glyoxal was used to cross-link cellulose nanofibers of the cellulose membrane, thereby reinforcing same.

Glyoxal is another good cross-linker for cellulose. It has a relatively short spacer between the two aldehyde groups. Based on the similar reaction in our coating system, glyoxal was used to cross-link cellulose nanofibers of the cellulose membrane, thereby reinforcing same, as shown in FIG. 12.

EXAMPLE 8

Figure 13:
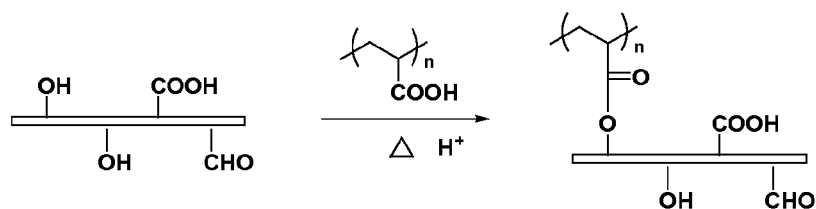
FIG. 13 demonstrates the use of polyacrylic acid (PAA) to cross-link cellulose nanofibers.

Considering that aldehyde reagents are slightly toxic in spite of the fact that only tiny amounts of GA or glyoxal was needed in the coating process, another good cross-linking reagent, regarded as non-toxic and also cost-effective, is polyacrylic acid (PAA) with different molecular weights. In the textile industry, 1,2,3,4-butanetetracarboxylic acid (BTCA) has been used as a cross-linking reagent for cellulose fibers. However, we prefer to use polyacrylic acid, instead of BTCA, because the former is non-crystalline which should decrease the risk to produce defects of the filter. The introduction of polyacrylic acid could not only cross-link the cellulose nanofibers, but also provide many new properties, such as anti-bacterial and anti-fouling properties. FIG. 13 shows the reaction between cellulose nanofibers and PAA.

A catalyst, sodium hypophosphite (SHP), was employed to promote the cross-linking reaction with PAA.

EXAMPLE 9

Figure 14:
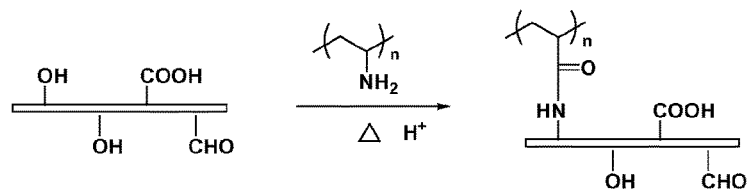
FIG. 14 demonstrates the use of polyvinylamine hydrochloride (PVAH) to cross-link cellulose nanofibers.

A similar cross-linker, polyvinylamine hydrochloride (PVAH, Polyscience, Inc.), based on the reaction between amino-groups of polyvinylamine and carboxylic groups located on the surface of cellulose nanofibers, was used to cross-link the cellulose nanofibers, as shown in FIG. 14.

EXAMPLE 10

Figure 15:
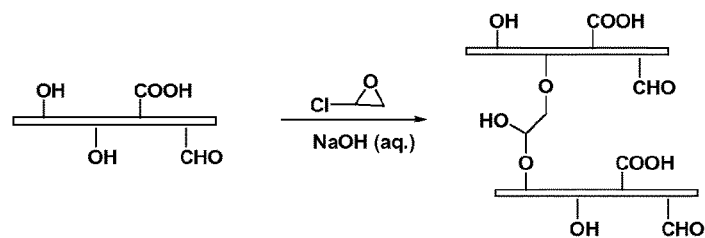
FIG. 15 demonstrates the use of epichlorohydrin (ECH) to cross-link cellulose nanofibers.

Epichlorohydrin (ECH) is a common cross-linking reagent in the food industry for polysaccharides. FIG. 15 shows the reaction between epoxy group, chlorine, and hydroxyl groups under basic conditions, thereby demonstrating how the cellulose nanofibers are cross-linked by ECH.

EXAMPLE 11

Figure 16:
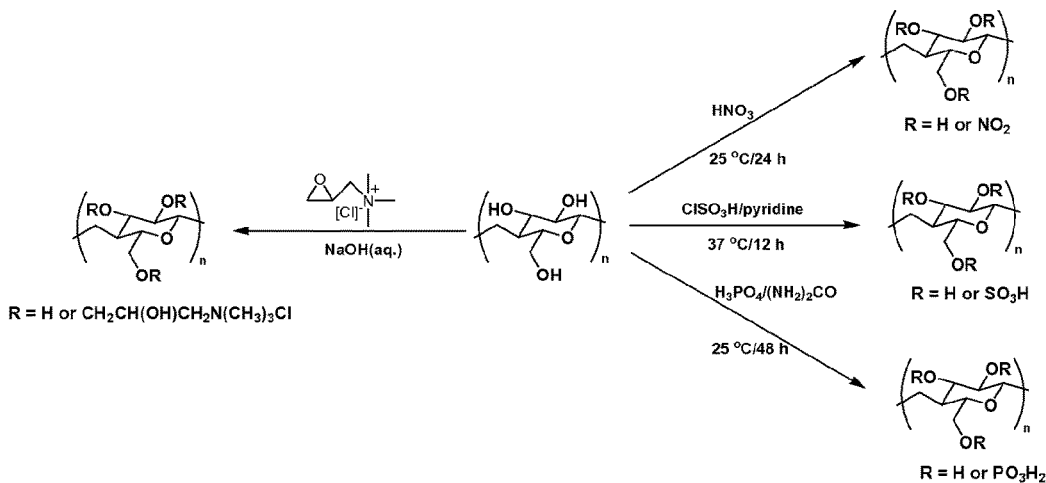
FIG. 16 demonstrates various strategies for modifying cellulose nanofibers in accordance with the present disclosure.

As described previously, there are various strategies for modifying cellulose nanofibers in accordance with the present disclosure. FIG. 16 shows the modification strategy of cellulose nanofibers.

As can be seen in FIG. 16, four modification strategies are suggested. The first includes ammonium salt that can be grafted onto the surface of the cellulose nanofibers by the reaction between epoxy groups of glycidyltrimethylammonium chloride and hydroxyl groups of cellulose under basic conditions.

The second includes esterification of cellulose nanofibers with nitric acid.

The third includes sulfonylation of cellulose nanofibers with methylsulfonyl chloride with pyridine as the catalyst.

The fourth includes esterification of cellulose nanofibers with phosphoric acid catalyzed by urea.

EXAMPLE 12

Materials used in this example, including glutaraldehyde (GA, 25 weight %) and hydrochloric acid, were purchased from Sigma-Aldrich, USA. Bacterial cellulose (BC) in the form of sheets from Hainan, China, were pretreated by washing in distilled water for three days to remove any other components. After washing, the washed bacterial cellulose sheets could be either cut into 100 cm$^2$ squares or punched into 45 mm diameter circular sheets to be used for further crosslinking with GA. It should be noted that the BC sheets were made up of cellulose fibers with diameters in the 30-50 nm size range, as shown in FIG. 18A, discussed in greater detail below.

To cross-link bacterial cellulose, hydrochloric acid solution was added to 500 mL of water to adjust the pH to about 1 and monitored with a pH meter. Then, 100 mL of glutaraldehyde (25 weight %) was added to the above acidic solution, and the solution was thoroughly mixed for 30 minutes. A piece of bacterial cellulose with an area of about 100 cm$^2$ was then added to the solution and remained for 12 hours. Both cross-linked and non-crosslinked bacterial cellulose were then freeze-dried before further characterization.

Fourier transform infrared spectroscopy (FT-IR) analysis was used to confirm the crosslinking reaction of bacterial cellulose with glutaraldehyde. The results, set forth in FIG. 17, include FT-IR spectra of the non-crosslinked bacterial cellulose (BC) and the bacterial cellulose cross-linked to glutaraldehyde (GABC).

Figure 17:
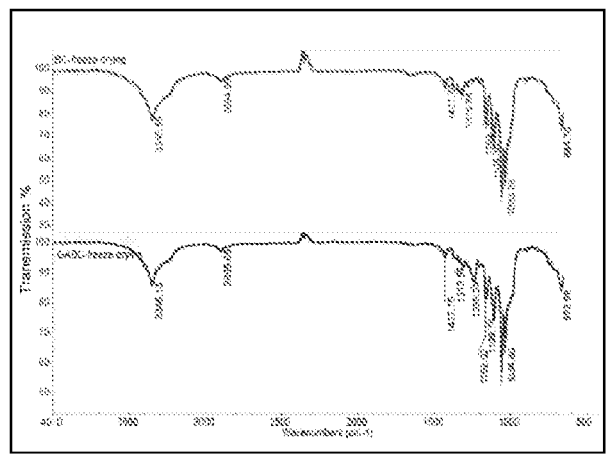
FIG. 17 include FT-IR spectra of non-crosslinked bacterial cellulose (BC) and bacterial cellulose cross-linked by glutaraldehyde (GABC)

As can be seen in FIG. 17, the hydroxyl group amount of bacterial cellulose decreased after cross-linking with GA, which implied that the cross-linking reaction occurred. There was a new peak at 1235 cm$^{-1}$ in the spectrum of GABC which could be assigned as the alkoxy group (ether bond) generated by the reaction of cellulose and GA.

Figure 18:
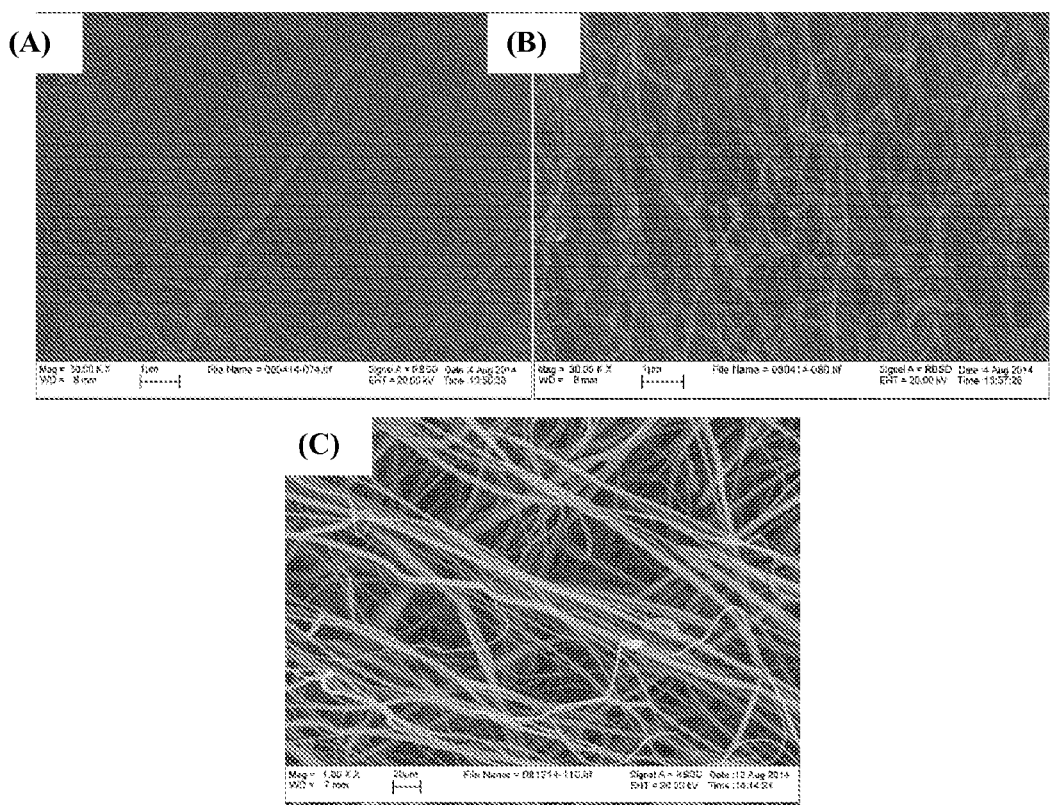
FIGS. 18A-C are SEM images showing the morphology of bacterial cellulose before and after crosslinking, as well as that of a commercially available PM2.5 mask filter.

The morphology of bacterial cellulose before and after crosslinking, as well as that of commercially available PM2.5 mask filter, was observed by SEM, as shown in FIGS. 18 A-C below. The SEM images include bacterial cellulose before (FIG. 18A) and after (FIG. 18B) crosslinking, as well as that of a commercially available PM2.5 mask filter (FIG. 18C). It should be noted that the cross-linked 3D membranes of the present disclosure possessed much smaller mean pore sizes than the mean pore size of the commercial PM2.5 mask filter, further demonstrating the potential flexibility of the methods and membranes of the present disclosure.

It is interesting to note that the bacterial cellulose could not withstand the high beam energy, as a result, the image was burned after short-term focusing. However, the bacterial cellulose after GA cross-linking became very stable, and a clear image could easily be obtained from SEM, suggesting that a cross-linking reaction had occurred between bacterial cellulose and GA in an acidic aqueous solution. The fiber diameter of GABC was about 30-50 nm, which remained the same before and after the cross-linking reaction. The porosity of the BC sheet before the cross-linking reaction was measured by weighing a wet BC sample of known volume and the same dried BC sample of known volume. The porosity of the cross-linked BC sheet after freeze drying was measured by weighing the cross-linked BC sheet of known volume in water and in the dry state. It was observed that the porosity before and after cross-linking remained about the same. Thus, GA cross-linking reaction did not essentially change the pore size and the porosity. Therefore, the 3-dimensional network of cellulose nanofibers had essentially the same porosity, even after cross-linking with GA or other cross-linkers.

The commercially available PM2.5 filter, as shown in FIG. 18(C), however, exhibited a much larger mean fiber diameter of about 500-1000 nm range, which was about 10-times higher than that of the BC cellulose, permitting the formation of membranes of the present disclosure having mean pore sizes over a large size range and yet with a much higher porosity. The combination implies that a much higher efficiency membrane for air purification with the new 3D morphology and highly functionalized polysaccharide-based fibrous systems was achieved.

It will be understood that various modifications may be made to the embodiments disclosed herein. Therefore, the above description should not be construed as limiting, but merely as an exemplification of preferred embodiments. Those skilled in the art will envision other modifications within the scope and spirit of the present disclosure. Such modifications and variations are intended to come within the scope of the following claims.

What is claimed is:

1. A membrane comprising:
   at least a first substrate layer including a polyolefin modified with at least one ionic compound; and
   at least a second layer including a three-dimensional network comprising a material selected from the group consisting of polysaccharide nanofibers, cellulose nanofibers, chitin nanofibers, chitosan nanofibers, polysaccharide nanofibrils, polysaccharide nanostrips, cellulose nanostrips, carbon nanofibers, carbon nanotubes, porous graphene nanosheets, porous graphene oxide nanosheets, bacterial cellulose, and combinations thereof.

2. The membrane of claim 1, wherein the polyolefin is selected from the group consisting of polyethylenes, polypropylenes, ethylene-propylene copolymers, ultra-high molecular weight polyethylenes, high pressure low density polyethylenes, linear low density polyethylenes, linear medium density polyethylenes, high density polyethylenes, and modified polyethylenes.

3. The membrane of claim 1, wherein the polyolefin comprises a polyethylene.

4. The membrane of claim 1, wherein the at least one ionic compound includes a cation selected from the group consisting of imidazolium, pyridinium and isoquinolinium.

5. The membrane of claim 1, wherein the at least one ionic compound is selected from the group consisting of 1-docosanyl-3-methylimidazolium and 1-docosanyl-3-methylimidazolium hexafluorophosphate.

6. The membrane of claim 1, wherein the three-dimensional network is crosslinked with a crosslinking agent selected from the group consisting of glyoxal, epichlorohydrin, polyacrylic acid, polyvinylamine hydrochloride, glutaraldehyde, 1,4-butanediol diglycidyl ether, formaldehyde, glyoxylic acid, oxydisuccinic acid, citric acid, polyethylenimine, polyvinyl alcohol, trimesoyl chloride, maleic anhydride, phosphorus oxychloride, trimetaphosphate, linear mixed anhydrides of acetic and di- or tribasic carboxlic acids, vinyl sulfone, diepoxides, cyanuric chloride, aldehyde, acetaldehyde, acrolein, and combinations thereof.

7. The membrane of claim 1, wherein the three-dimensional network comprises nanofibers having a diameter from about 3 nm to about 50 nm.

8. The membrane of claim 1, wherein the three-dimensional network has a thickness from about 20 nm to about 5000 μm.

9. The membrane of claim 1, wherein the membrane has a thickness from about 0.1 μm to about 10000 μm.

10. A process for filtering a gas by passing the gas through the membrane of claim 1.

11. A method of producing a filtration membrane comprising:
   contacting a porous substrate, including polyolefin with at least one ionic compound, to form a substrate; and
   applying to the substrate a three-dimensional network including a material selected from the group consisting of polysaccharide nanofibers, cellulose nanofibers, chitin nanofibers, chitosan nanofibers, polysaccharide nanofibrils, polysaccharide nanostrips, cellulose nanostrips, carbon nanofibers, carbon nanotubes, porous graphene nanosheets, porous graphene oxide nanosheets, bacterial cellulose, and combinations thereof, to form the filtration membrane.

12. The method of claim 11, wherein the polyolefin is selected from the group consisting of polyethylenes, polypropylenes, ethylene-propylene copolymers, ultra-high molecular weight polyethylenes, high pressure low density polyethylenes, linear low density polyethylenes, linear medium density polyethylenes, high density polyethylenes, and modified polyethylenes.

13. The method of claim 11, wherein the polyolefin comprises a polyethylene.

14. The method of claim 11, wherein the at least one ionic compound includes a cation selected from the group consisting of imidazolium, pyridinium and isoquinolinium.

15. The method of claim 11, wherein the at least one ionic compound is selected from the group consisting of 1-docosanyl-3-methylimidazolium and 1-docosanyl-3-methylimidazolium hexafluorophosphate.

16. The method of claim 11, further comprising crosslinking the three-dimensional network by contacting the three-dimensional network with a crosslinking agent selected from the group consisting of glyoxal, epichlorohydrin, polyacrylic acid, polyvinylamine hydrochloride, glutaraldehyde, 1,4-butanediol diglycidyl ether, formaldehyde, glyoxylic acid, oxydisuccinic acid, citric acid, polyethylenimine, polyvinyl alcohol, trimesoyl chloride, maleic anhydride, phosphorus oxychloride, trimetaphosphate, linear mixed anhydrides of acetic and di-or tribasic carboxlic acids, vinyl sulfone, diepoxides, cyanuric chloride, aldehyde, acetaldehyde, acrolein, and combinations thereof.

17. The method of claim 11, wherein the three-dimensional network comprises nanofibers having a diameter from about 3 nm to about 50 nm.

18. The method of claim 11, wherein the three-dimensional network has a thickness from about 20 nm to about 5000 μm.

19. The method of claim 11, wherein the filtration membrane has a thickness from about 0.1 μm to about 10000 μm.

20. A process for filtering a gas by passing the gas through the filtration membrane produced by the method of claim 11.

21. The membrane of claim 1, wherein the at least one ionic compound includes an anion selected from the group consisting of bromide, tetrafluoroborate, hexafluorophosphate, and bis(perfluoroethylsulfonyl)imide.

22. The method of claim 11, wherein the at least one ionic compound includes an anion selected from the group consisting of bromide, tetrafluoroborate, hexafluorophosphate, and bis(perfluoroethylsulfonyl)imide.

* * * * *